United States Patent [19]
Wilkie, II et al.

[11] Patent Number: 6,111,745
[45] Date of Patent: Aug. 29, 2000

[54] SWITCHGEAR CONDUCTORS AND MOUNTING ARRANGEMENTS THEREFOR

[75] Inventors: William Edward Wilkie, II; Rodney William Bruner, both of Fletcher; Neal Edward Rowe, Ashville; Steven Dale Walker, Arden, all of N.C.

[73] Assignee: Eaton Corporation, Cleveland, Ohio

[21] Appl. No.: 09/188,470

[22] Filed: Nov. 9, 1998

[51] Int. Cl.[7] ...................................................... H02B 5/00
[52] U.S. Cl. .......................... 361/605; 361/611; 361/621; 361/624; 361/631; 361/632; 361/637; 361/638; 361/639; 361/640; 361/648; 361/649; 361/650; 174/52.1; 174/68.2; 174/72 B; 174/71 B
[58] Field of Search .................................... 361/605, 611, 361/614, 621, 622, 624, 627–632, 641–649, 673, 675; 174/51, 52.1, 68.2, 68.3, 72 B, 71 B, 99 B, 129 B

[56] References Cited

U.S. PATENT DOCUMENTS

| | | | |
|---|---|---|---|
| 2,578,750 | 12/1951 | Scott, Jr. ................................... | 361/608 |
| 2,997,627 | 8/1961 | Ellegood .................................. | 361/614 |
| 3,463,968 | 8/1969 | Olashaw .................................. | 361/614 |
| 3,662,133 | 5/1972 | Bould et al. ............................. | 218/151 |
| 4,307,304 | 12/1981 | Kovatch et al. ......................... | 307/147 |
| 4,740,864 | 4/1988 | Stanfield et al. ......................... | 361/611 |
| 4,822,951 | 4/1989 | Wilson et al. ........................... | 174/68.2 |
| 5,124,881 | 6/1992 | Motoki .................................... | 361/605 |
| 5,157,584 | 10/1992 | Rowe . | |

*Primary Examiner*—Leo P. Picard
*Assistant Examiner*—Boris L. Chervinsky
*Attorney, Agent, or Firm*—Martin J. Moran

[57] ABSTRACT

The interface conductors, stabs and runbacks, which are engaged at first ends by quick disconnects on electrical apparatus in a switchgear assembly, are fabricated from a stacked pair of elongated, flat conductors secured together at the first ends by elongated fasteners which are compressed into countersunk through apertures in the flat conductors to form a joint with no lateral projections. The interface conductors are supported adjacent the disconnects by a first support having a base member with through openings in which the conductors are snugly supported, and rigid projections with planar surfaces extending from the base member toward the quick disconnects alongside the openings and against which the interface conductors are secured adjacent free ends of the projections. A second support spaced rearward of the first support provides additional support for the runbacks. Interphase supports formed by C-channels are provided for the runbacks between the first and second supports.

14 Claims, 8 Drawing Sheets

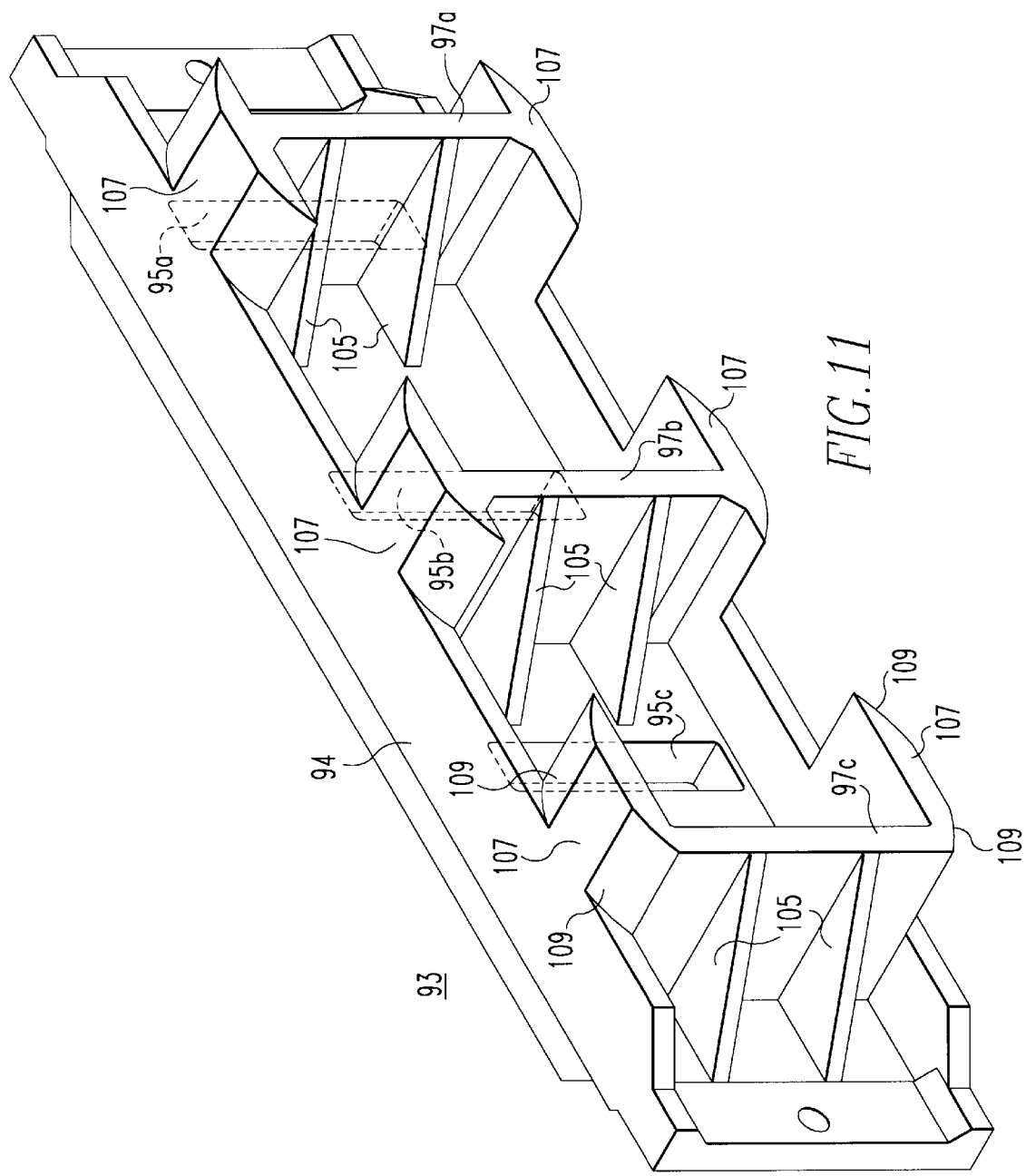

SWITCHGEAR CONDUCTORS AND MOUNTING ARRANGEMENTS THEREFOR

CROSS REFERENCE TO RELATED APPLICATION

Commonly owned, concurrently filed application Ser. No. 09/188,721 entitled "SWITCHGEAR RISER CONSTRUCTION AND MOUNTING"

BACKGROUND OF THE INVENTION

1. Field of the Invention

This invention relates to switchgear assemblies for electric power distribution systems. More particularly, it relates to the construction and support of the rigid electrical conductors forming buses which route the power within the switchgear cabinet, and especially to the conductors which form the stabs engaged by the quick disconnect electrical connectors on the electrical apparatus housed within the switchgear cabinet.

2. Background Information

Switchgear assemblies are combinations of electrical apparatus for electric power distribution systems mounted in metal cabinets. The electrical apparatus typically includes switching devices such as circuit breakers and network protectors which provide protection as well as switching, disconnect switches which isolate or separate parts of the distribution system, and transfer switches which are used to connect the system to alternative power sources. A switchgear assembly can also include instrumentation such as metering equipment.

Typically, several pieces of electrical apparatus are mounted in a single cabinet, usually stacked vertically. Multi-phase input and output electrical conductors must be connected to each piece of electrical apparatus. In a common arrangement, a set of multi-phase rigid conductors or bus bars extends transversely through the cabinet. A set of multiphase risers extending vertically within the cabinet behind the electrical apparatus connects the transversely extending conductors with the individual electrical apparatus through stabs which are engaged by quick disconnects on back faces of the electrical apparatus as the apparatus is fully inserted into the cabinet. Another set of rigid conductors, called runbacks, engage other quick disconnects on the electrical apparatus and extend rearward between the risers for connection to cabling extending out of the cabinet.

It is common practice for the conductors interfacing with the electrical apparatus, i.e., the stabs connected to the risers, and the runbacks connected to the cabling, to each be a single, thick, flat copper conductor. Such thick, single piece conductors generally have sufficient stiffness to withstand the very large magnetic forces generated by short circuits to which the equipment may be exposed. Also, at the present rated currents for the electrical apparatus used in such switchgear assemblies, it is not difficult to maintain the electrical spacing required between the conductors.

However, as the current ratings of the electrical apparatus used in switchgear assemblies increases, the increased thickness required of the conductors to accommodate temperature rise restrictions requires machining and drilling of the conductors to produce the necessary configurations and mounting holes in these conductors. The need for such operations increases the cost and time required to manufacture the switchgear assemblies.

In some switchgear, the stabs are formed by bending a flat conductor back on itself with the two sections straddling the associated riser. This produces a rather large radius bend which must be engaged by the quick disconnect. Some quick disconnects cannot accommodate this large radius and instead require a square cut stab end.

Another consideration in switchgear construction is that supports need to be provided for the interface conductors adjacent the quick disconnects. In a common arrangement, the interface conductors are inserted through snug openings in a molded support from the riser side. Hence, the inserted ends of these interface conductors cannot have lateral protrusions.

There is room, therefore, for improvement in the conductors used in switchgear assemblies and in the switchgear incorporating such conductors.

SUMMARY OF THE INVENTION

In accordance with the present invention, the rigid electrical conductors which interface with the quick disconnects on the electrical apparatus of switchgear assemblies comprise at least two stacked, elongated flat conductors. First ends of these elongated flat conductors which engage the quick disconnects are slipped through snug openings in a first or stab support adjacent the quick disconnects. While the flat members must be firmly secured together to avoid splaying during engagement with the quick disconnects, the fasteners must be non-projecting to allow the conductors to pass through the openings in the stab support. To this end then, the flat members have aligned bores adjacent the free ends with recesses at the outer surfaces. Fasteners extending through the apertures have enlarged heads which are fully seated within these recesses.

Such multi-piece conductors can be readily formed by a stamping operation which also forms the apertures with the recesses which are preferably countersinks. Preferably, the fastener is an electrically conductive slug, longer than the combined thickness of the flat members, which is compressed into the countersinks.

The invention also embraces the switchgear which includes such multi-pieced conductors for interfacing with the electrical apparatus. Such interface conductors extend generally horizontally within the switchgear cabinet. Some of these interface conductors are connected to risers which extend vertically within the cabinet. Others of the interface conductors are runbacks which extend between the risers, rearward for connection with cabling. Both the stabs connected to the risers and the runbacks are supported by the first or stab support which is positioned between the first ends engaged by the quick disconnects on the electrical apparatus and the risers. An additional or second support for the runbacks is spaced horizontally from the risers remotely from the stab supports. Preferably, the at least two flat elongated members forming the stab conductors straddle the risers.

Supports for the interface conductors can further include phase-to-phase supports between the risers and the runback supports. Such phase-to-phase supports comprise a spacer extending between adjacent of these other conductors with flanges on each end and fasteners securing the flanges to the conductors. Preferably, the phase-to-phase supports are formed by C-channels in which the webs form the spacers and the legs form the flanges. Two C-channels can be mounted with their webs back to back to form a phase-to-phase support having opposed flanges extending laterally at each end of the spacer.

Preferably, the stab supports have a base with through openings for the interface conductors and rigid extensions extending from the base along side the openings. Fastener means secure the conductors to the rigid extensions adjacent free ends thereof. In a preferred form, the rigid extensions have a planar surface aligned with the edge of the opening and against which the flat conductors are secured by the fastener means.

The other interface or runback conductors include some conductors having second ends of the flat members adjacent the runback supports which are offset laterally by a transverse section. The flat members of this transverse section are spaced apart while the sections at the two ends abut. This facilitates alignment of apertures in the offset second ends of the flat members.

The invention also embraces a switchgear assembly which includes a set of rigid interface conductors projecting toward the quick disconnects on electrical apparatus within a switchgear cabinet, and a conductor support spaced from the quick disconnects and having a base member with through openings aligned with the quick disconnects through which the rigid conductors extend. The base member has rigid extensions projecting toward the quick disconnects and fastener means secure the conductors to the rigid extensions adjacent free ends. Preferably, the conductors comprise at least a pair of stacked, elongated flat members and the rigid extensions have a planar surface aligned with an edge of the through openings against which the flat members are secured by the fastener means. In a more preferred form, the rigid extensions projecting from the base member are planar members with bracing between the base and the planar members for resisting magnetic repulsion forces exerted on the conductors by short circuits.

BRIEF DESCRIPTION OF THE DRAWINGS

A full understanding of the invention can be gained from the following description of the preferred embodiments when read in conjunction with the accompanying drawings in which:

FIG. 11 is a rear isometric view of our rear runback support.

DESCRIPTION OF THE PREFERRED EMBODIMENTS

Figure 1:
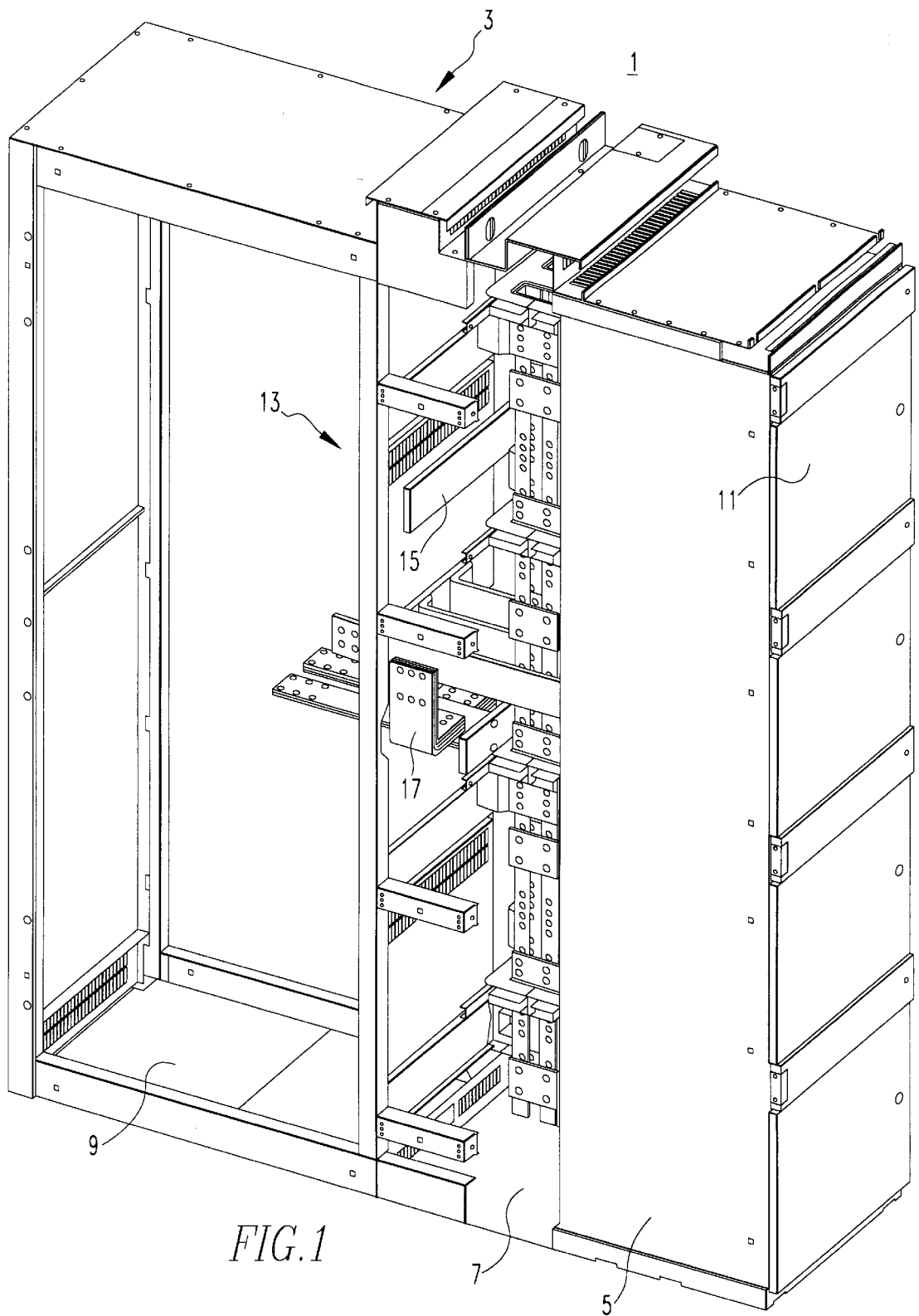
FIG. 1 is an isometric view of a switchgear assembly incorporating the invention.

FIG. 1 illustrates a switchgear assembly 1 incorporating the invention which includes a metal cabinet 3 having a front compartment 5, a middle compartment 7 and a rear compartment 9. The front compartment 5 has a plurality of vertically stacked cells each having a front door 11. Each cell can contain electrical apparatus such as, for instance, a circuit breaker. The middle compartment 7 houses the main cross bus 13 which includes phase conductors 15 (only one shown in FIG. 1) and a neutral conductor 17. The rear compartment 9 houses cabling (not shown). This cabling and the main cross bus 13 connect the switchgear assembly 1 into an electric power distribution system (not shown).

Figure 2:
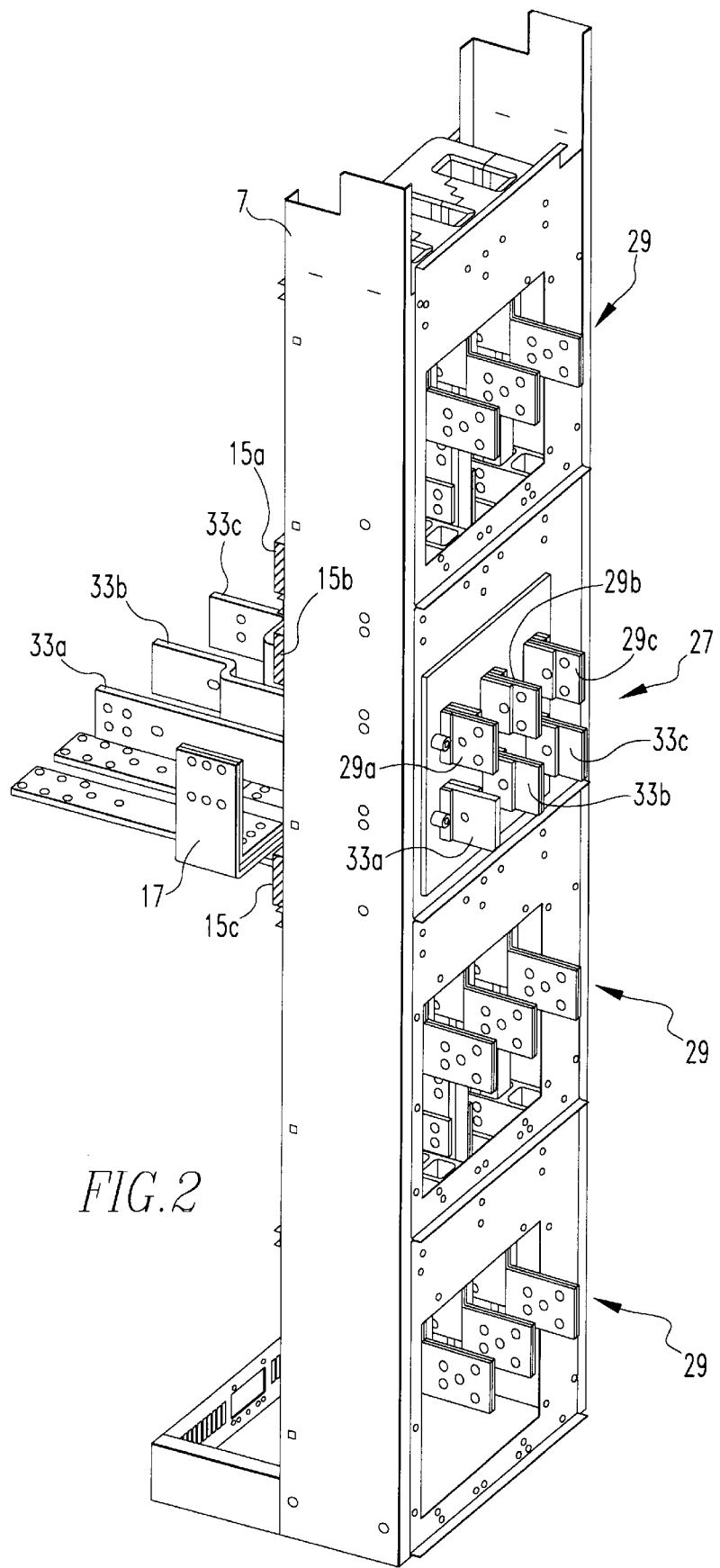
FIG. 2 is an isometric view generally from the front of a middle compartment of the switchgear assembly of FIG. 1 with some parts removed.
Figure 3:
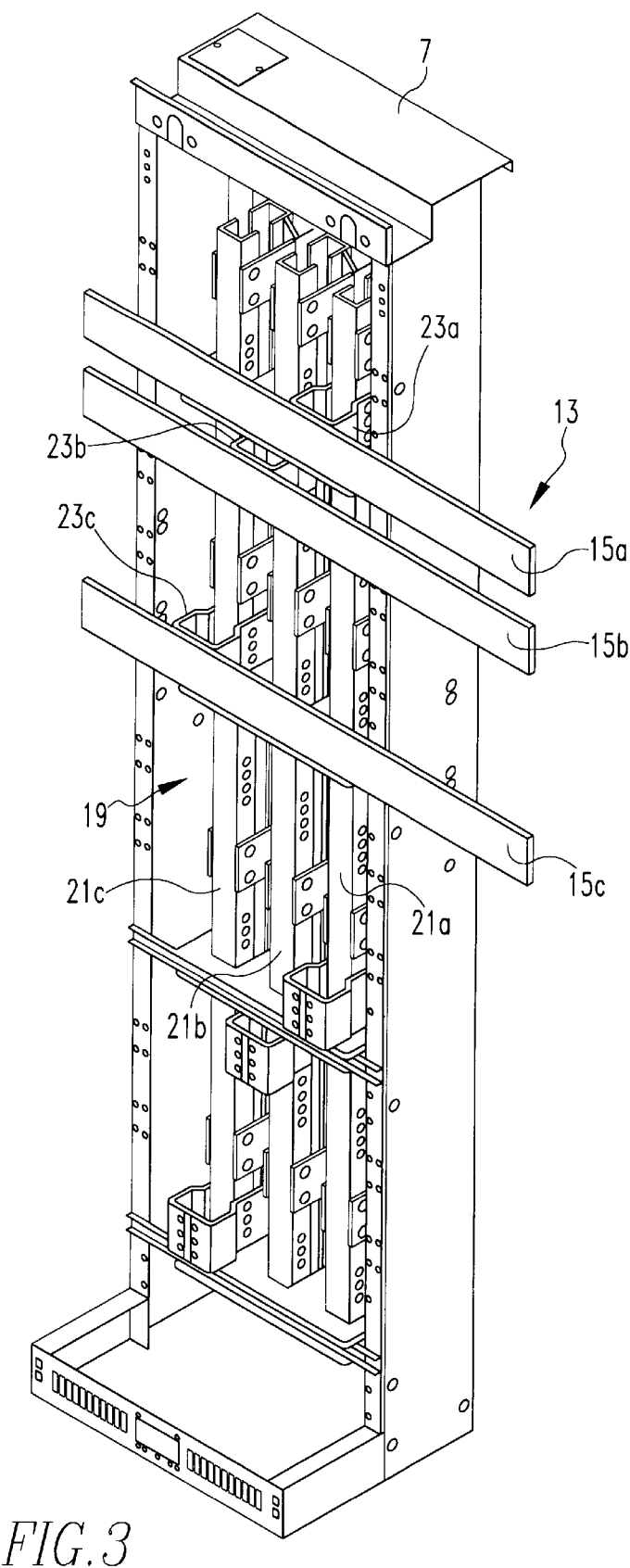
FIG. 3 is an isometric rear view of the middle compartment of the switchgear with some parts removed.

FIGS. 2 and 3 illustrate in more detail the arrangement of buses within the middle compartment 7. The main cross bus 13 includes vertically spaced horizontally extending phase conductors 15a, 15b and 15c. Also housed in the middle compartment 7 is a vertical bus 19 which includes risers 21a, 21b and 21c which are connected to the associated phase conductor 15 of the main cross bus 13 by main conductor taps 23a, 23b and 23c.

Figures 4, 4A:
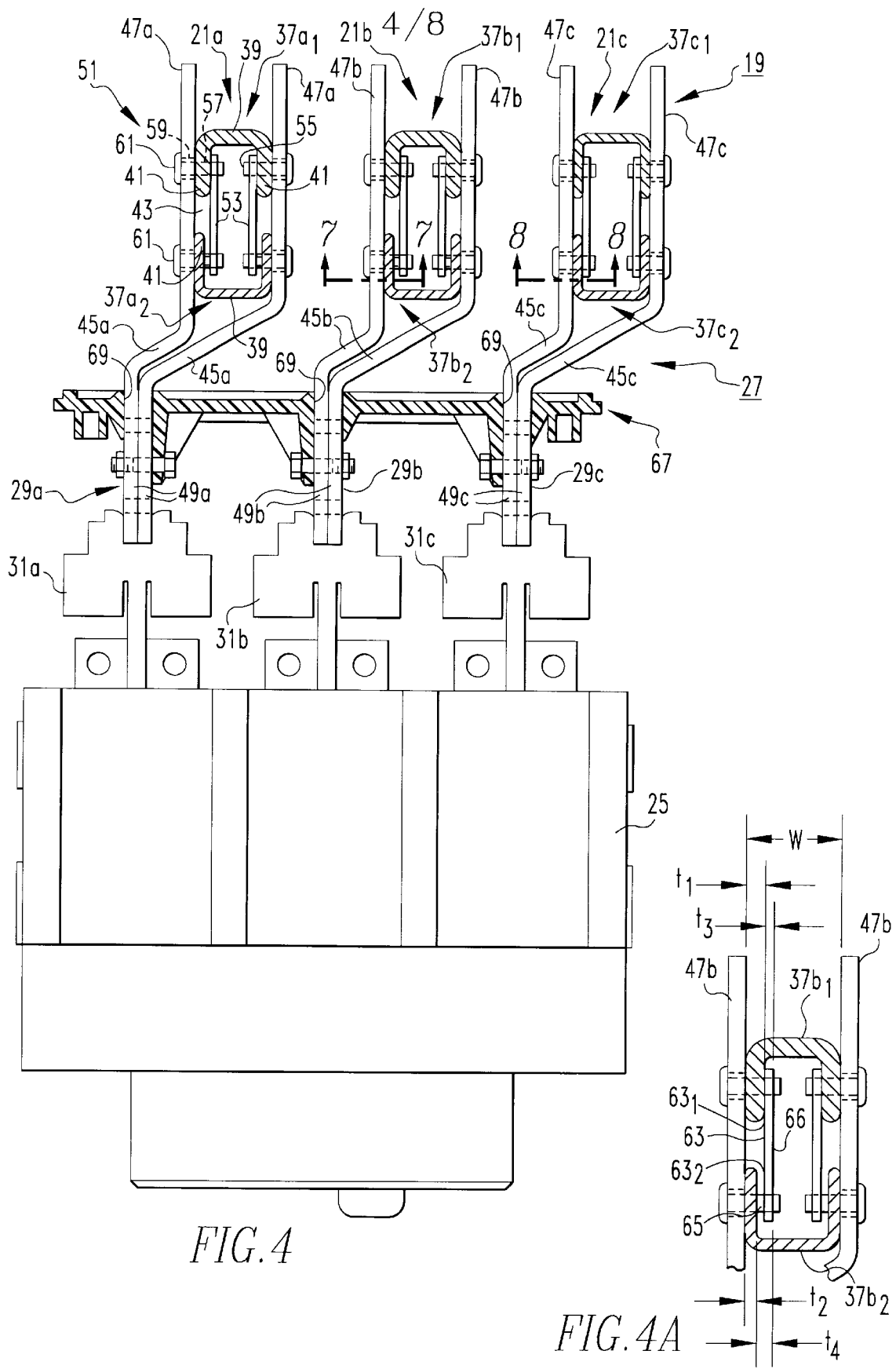
FIG. 4 is a horizontal sectional view through the bus bars in the middle compartment of the switchgear generally at the level of stabs and illustrating their connection to an electrical apparatus forming part of the switchgear.
FIG. 4A is an enlargement of a portion of FIG. 4.
Figure 5:
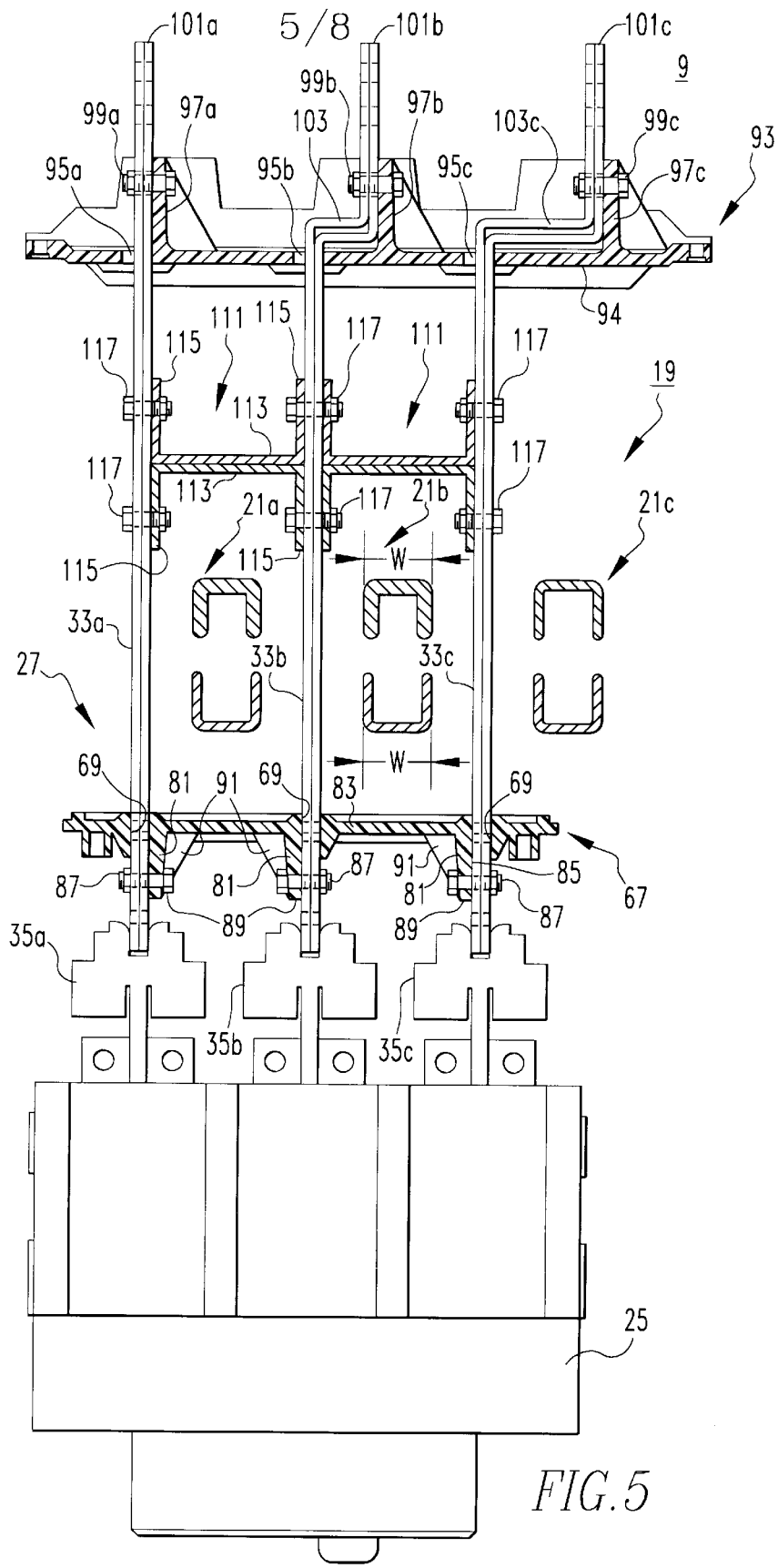
FIG. 5 is a horizontal section view similar to FIG. 4 but at a level just above the runback connections.

As mentioned, the front compartment 5 of the switchgear cabinet 3 contains electrical apparatus stacked vertically. This electrical apparatus, such as circuit breakers, must be connected to the bus systems. Thus, as shown in FIGS. 4 and 5, the electrical apparatus 25 is connected to the bus systems by interface conductors 27. These interface conductors 27 include stab conductors 29a, 29b and 29c which connect the risers 21a, 21b and 21c to the electrical apparatus 25 through quick disconnects 31a, 31b and 31c. The other side of the electrical apparatus 25 is connected to interface conductors 27 in the form of runbacks 33a, 33b and 33c through another set of quick disconnects 35a, 35b and 35c. As shown in FIG. 5, the runbacks 33 pass between the risers 21 and extend into the rear compartment 9 where they are connected to cabling (not shown).

Each of the risers 21 is a hollow conductor which is a more efficient conductor of AC current than a solid flat conductor or the H conductors of the prior art as they concentrate the conductive material at the periphery where the current is concentrated as a result of the skin effect. The hollow conductors 21 are formed by a pair of confronting electrically conductive U channels $37a_1$–$37c_2$ as shown in FIG. 4. Each of the channels includes a bight 39 and a pair of parallel legs of 41 extending from opposite ends of the bight. The pairs of U channels 37 are mounted in spaced confronting relationship with the legs of the two U channels 37 of each pair extending toward each other. Preferably, the confronting channels 37 of each pair are laterally spaced from each other by a gap 43. This allows convective circulation of cooling air through the hollow risers 21 thereby lowering the temperature rise for a given ampere rating. The paired U channels 37 of each of the risers 21 are fixed in spaced relation by supports in the form of the main bus taps 23a–23c and the stab conductors 29a–29c.

Figure 6:
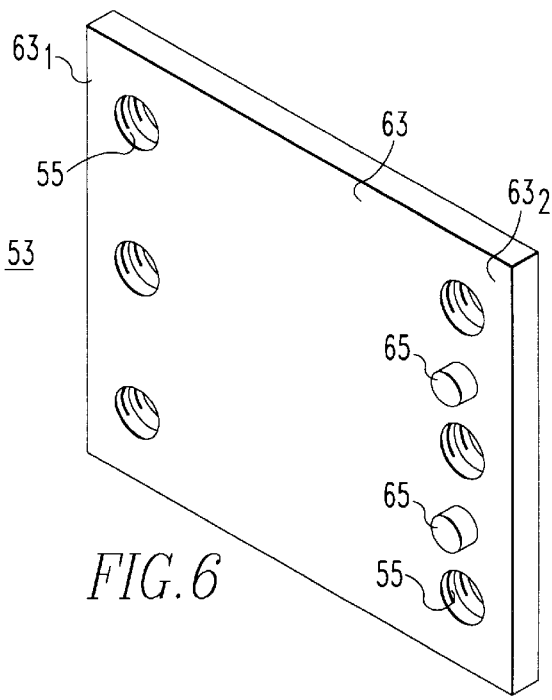
FIG. 6 is an isometric view of a mounting plate in accordance with the invention.

As also seen in FIG. 4, the stab conductors 29a–29c each comprise a pair of flat stab conductor elements 45a–45c. These stab elements 45 have flat sections 47a–47c straddling the pair of U channels 37 of the associated riser 21, and terminal sections 49a–49c extending generally laterally from the U channels 37 and joined together to engage the associated quick disconnect 31. The flat sections 47 of the stab conductors 29 are secured to the associated pair of U channels by stab mounts 51. These mounts 51 include backing plates 53 (see FIG. 6) having two sets of apertures 55 aligned with apertures 57 in the legs of the risers and apertures 59 through the flat sections 47 of the stab conductors 29. The mounts 51 further include bolts 61 which extend through the apertures 59 and 57 and engage the tapped apertures 55 in the backing plates to clamp the legs 41 of the U channels 37 between the backing plates and the stab conductor elements 45. This arrangement solves the problem of securing the stab conductors 29 to the confronting U channels 37 of the risers 21. While a nut could easily be applied to a bolt in one of the U channels, access to the inside of the confronting channel is then very limited. The backing plates 53 with the tapped holes 55 being common to both channels of each riser make assembly of the hollow risers 21 much simpler.

Figure 7:
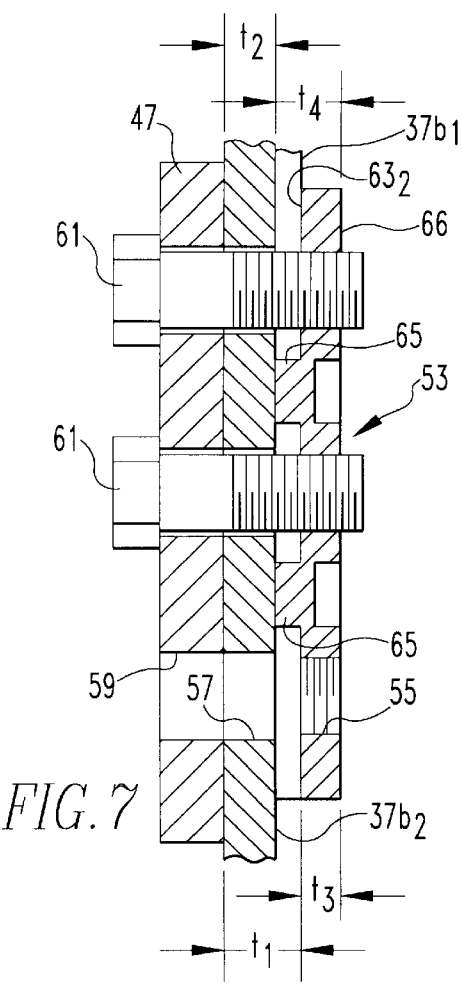
FIG. 7 is a fragmentary vertical section taken through a riser showing a stab connection for a U channel which is smaller than its mating U channel.
Figure 8:
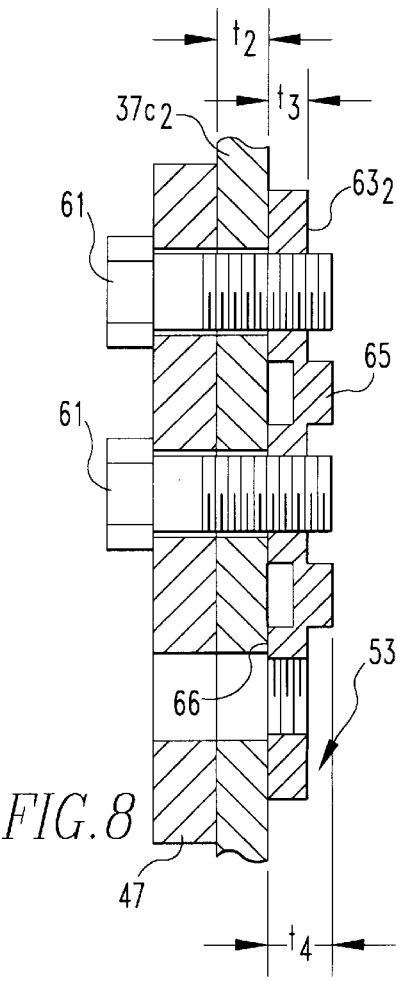
FIG. 8 is similar to FIG. 7 showing a stab connection for a U channel which is equal in thickness to its mating channel.

The low voltage switchgear (up through 600 volts) for which this invention is particularly suitable, is typically provided with a range of current ratings such as, for example, 2,000, 3,200, 4,000 and 5,000 amperes. The risers 21 must provide the appropriate conductor cross section to meet temperature limitations for each of these current ratings. The hollow conductor arrangement is particularly suitable for making this accommodation. In particular, the thickness t of the sheet material which is roll formed into the U channels 37 is selected to provide the appropriate conductor cross section. In order to standardize supports and other dimensions within the switchgear, all of the U channels 37 are formed with a common width w between the outer surfaces of the legs 41. With this dimension of the U channels fixed, it is possible to use different thicknesses for the two U channels 37 in a confronting pair to accommodate a particular current rating. In order to make a solid connection between the risers and the stab conductors 29, the backing plates 53 are configured to accommodate for this variation in thickness of the U channel legs. Thus, where the legs 41 of the confronting pair of U channels 37 have thicknesses $t_1$ and $t_2$, the backing plate 53 has a first face 63 with a first section 63, having a thickness $t_3$ determined by the thickness of the sheet material from which the backing plate is fabricated (see FIGS. 4A, 7 and 8). The thickness $t_4$ of the second section $63_2$ is provided by projections 65. Advantageously, the backing plates 53 can be inexpensively made by a stamping process which punches the mounting holes 55 through the plate, and forms the projections 65 by partial penetration of the plate. The second face 67 of the backing plate 53 is planar. When the thicknesses $t_1$ and $t_2$ of the confronting legs of the pair of U channels 37 are different, the backing plate is mounted with the first face 63 bearing against the inner faces of the channel legs 41 with the second section $63_2$ with the projection 65 bearing against the thinner U channel leg as shown in FIGS. 4A and 7. By making the thicknesses $t_1$ plus $t_3$ equal to $t_2$ plus $t_4$, the backing plate 53 will seat firmly inside the two different thickness U channels. When the same size U channels are used for a confronting pair in a riser, the backing plate 53 is turned over so that the second, planar face 66 bears against the inside of the channel legs 41 as shown in FIG. 8. By standardizing the variation in thickness of the material used for the U channels, the backing plates 53 can be used with any two consecutive thicknesses of U channels.

The interface conductor 27, which include the stab conductors 29 and runbacks 33 which engage each circuit breaker, are supported by a first or forward support member 7. This forward support is an electrically insulated panel which also serves as a barrier between the front compartment 5 and middle compartment 7. The forward support has slots or openings 69 through which the stab conductors 29 and runbacks 33 extend for engagement with the quick disconnects 31 on the electrical apparatus 25.

Figure 9:
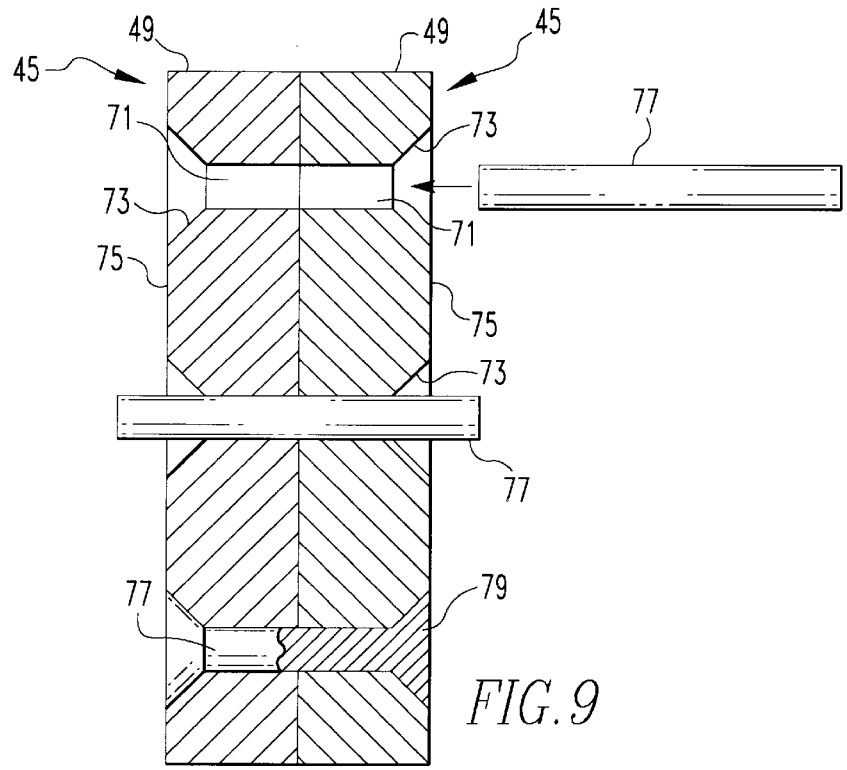
FIG. 9 is a section through an interface conductor forming part of the invention showing the steps of assembly.

As previously described in connection with FIG. 4, each stab comprises a pair of flat stab conductor elements 45a having terminal sections 49a–49c which are engaged by the quick disconnects 31a–31c. These flat terminal sections 49 must be firmly secured together so that the pair of thin strips act as a beam. The terminal sections must be joined together so that there are no protrusions which would interfere with the engagement with the disconnects 31. Also, these terminal sections are passed through the slots 69 in a front support 67 from the rear, so that again there can be no protrusions which would interfere with this snug fit with the front support 67 which prevents arcs from propagating between compartments and provides stability for the conductors. As shown in FIG. 9, the pair of elongated flat members 49 forming an interface conductor 27 are stacked flat against each other. Aligned apertures 71 extend through the flat conductors and have recesses, preferably in the form of beveled countersinks 73 at outer surfaces 75 of the flat conductors 49. An elongated fastener 77 is inserted through the aligned apertures 71 and has enlarged ends 79 which are fully seated in the recesses 73. Preferably, the fastener 77 is a piece of soft copper round stock which is initially greater in length than the combined thickness of the conductors 49. The two ends of the fastener 77 are mechanically pressed so that the material in the extra length of the round stock fills the countersinks 73 and the fastener 77 becomes a double-side rivet. Thus, the pair of flat conductors are securely fastened together to become a beam, but without any protrusions so that they can snugly fit through the openings 69 in the forward support 67.

Figure 10A:
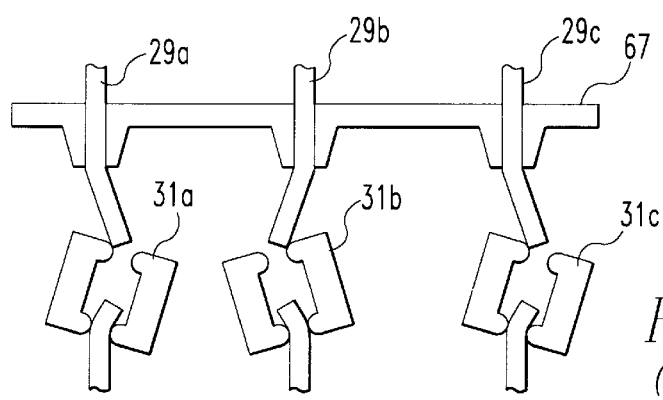
FIG. 10A illustrates a forward support arrangement for interface conductors as provided by the prior art showing the effects of a short circuit.

It has been found that when the interface conductors are cantilevered forward an extended distance from the forward support 67 that the sizable magnetic forces generated by short circuits can result in bending of the interface conductors such as the stabs 29 as shown in FIG. 10A. This produces a poor connection with the quick disconnects 31 and can even result in a disconnect.

Figure 10B:
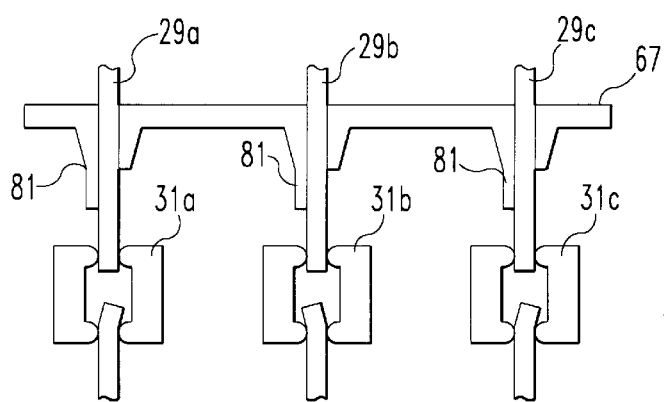
FIG. 10B illustrates our forward interface conductor support arrangement, showing its resistance to distortion due to a short circuit.

In accordance with another aspect of the invention, the front support 67 is provided with integrally formed rigid extensions 81 projecting forward from the base panel member 83 toward the quick disconnects along side the openings 69 as shown particularly in FIG. 5. These rigid extensions 81 have planar surfaces 85 against which the interface conductors 27 such as the runbacks 33 are firmly seated by fasteners 87 near the free end 89 of the rigid extensions. The rigid extensions 81 are stiffened by integral braces 91. The added support given to the interface conductor 27 by the rigid extensions 81 on the forward support 67 reduce the tendency of these conductors to bend under short circuit conditions as shown in FIG. 10B.

The runbacks 33, which form the other interface conductors 27 in addition to the stabs 29, are also fabricated from a stacked pair of flat conductors which are similarly secured together, particularly at the forward end where they engage the disconnects 31, by fasteners with enlarged heads which are seated within countersinks in apertures through the flat conductors. Thus, the runbacks 33 are also inserted from the rear through the snug fitting slots 69 in a forward support 67.

The runbacks 33 extend rearward between the risers 21 of the vertical bus 19 and into the rear compartment 9 where they are connected to cabling (not shown). The runbacks 33 are supported adjacent to the interface between the middle compartment 7 and the rear compartment 9 by a second or rear support 93 as shown in FIG. 5. Referring also to FIG. 11, this rear support 93 has a molded base 94 with slots 95 through which the conductors 33 extend. In order to provide greater lateral spacing between the runbacks in the rear compartment, the runback 33*a* extends straight through the rear support. An integrally molded support flange 97*a* extends rearward alongside the slot 95*a* into which the runback 33*a* is secured by a fastener 99*a*. A second integrally molded flange 97*b* is offset laterally from the slot 95*b*. The rearward end 101*b* of the runback 33*b* is offset laterally from the remainder of the runback by a transverse section 103*b* so that the end section seats against and is supported by the flange 97*b* to which it is secured by fastener 99*b*. The runback 33*c* has a transverse section 103*c* which offsets the rear end 101*c* from the opening or slot 95*c*. The end 101*c* is secured by fasteners 99*c* to the integrally molded support flange 97*c* which itself is offset laterally from the opening or slot 95*c*. The transverse section 103*c* is twice as long as the transverse section 103*b* so that equal increased spacing is provided between the 3 runbacks. In the transverse sections, the pair of conductors are spaced apart to permit alignment of rivits located in front in case of bend error. Other arrangements to increase the lateral spacing between the runback and the rear compartment 9 are possible. For instance, the center runback 33*b* could go straight through the rear support 93 with the 2 outer runbacks 33*a* and 33*c* having oppositely outwardly directed transverse sections.

As shown in FIG. 11, the rear support 93 has integrally formed braces 105 providing stiffening for each of the support flanges 97. It also has upper and lower horizontal extensions 107 on the support flanges 97 which are rounded at the corners 109 to provide supports for toroidal current transformers (not shown) through which the runbacks extend. Similar supports (not shown) for toroidal current transformers can be molded on the rigid extensions of the forward support 67.

In addition to the front supports 67 and rear supports 93, phase-to-phase supports 111 are provided between the runbacks 33 between the risers 21 and the second or rear support 93 as shown in FIG. 5. These phase-to-phase supports 111 comprise a spacer 113 extending between adjacent runbacks 33 and flanges 115 on each end of the spacers bearing against and secured to the runbacks by fasteners 117. In the exemplary embodiment of this aspect of the invention, these phase-to-phase supports 111 are C channel members having a web forming the spacer 113 and with the flanges 115 extending from the ends of the web. Preferably, pairs of the C channels are mounted back to back. Alternatively, I channels can be used. These phase-to-phase supports are preferably molded of an electrically insulative resin.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A switchgear conductor for engagement by a quick disconnect, said switchgear conductor comprising:

a stacked pair of elongated flat members having first ends for engagement by said quick disconnect and at least one set of aligned, through apertures adjacent said first ends of said elongated flat members with recesses around each aperture at outer surfaces of said elongated flat members, and at least one fastener extending through said at least one set of aligned through apertures and having enlarged ends fully seated in said recesses.

2. The switchgear conductor of claim 1 wherein said recesses around each aperture at said outer surfaces of said elongated flat members are beveled countersinks.

3. The switchgear conductor of claim 2 wherein said fastener comprises an electrically conductive slug longer than a combined thickness of said pair of elongated flat members which is compressed into said countersinks.

4. The switchgear conductor of claim 1 wherein said fastener comprises an electrically conductive slug longer than a combined thickness of said pair of elongated flat members which is compressed into said recesses.

5. A switchgear assembly comprising:

a cabinet;

at least one electrical apparatus removably mounted in said cabinet and having a set of quick disconnects projecting from a face thereof;

conductor supports including a first support extending across and spaced from said set of quick disconnects and having a set of through openings aligned with said set of quick disconnects; and a plurality of buses mounted in said cabinet and including interface conductors having first ends inserted through and supported in said through openings in said first support in position for engagement by said set of quick disconnects, each of said interface conductors comprising a stacked pair of elongated flat members having at least one set of aligned countersunk through apertures adjacent said first end, and a fastener with enlarged ends extending through and fully seated within said at least one set of aligned, countersunk through apertures clamping said free ends of said pair of elongated flat members together.

6. The switchgear assembly of claim 5 wherein said interface conductors extend generally horizontally within said cabinet and said plurality of buses include a set of risers extending vertically in said cabinet adjacent said first support and spaced by said first support from said quick disconnects, and wherein said conductor supports include a second support spaced horizontally from said risers remotely from said first support, some of said interface conductors are stabs connected to said risers and others of said interface conductors are runbacks extending between said risers and through said second support.

7. The switchgear assembly of claim 6 wherein said stabs have second ends of said pair of elongated flat members straddling and connected to said risers.

8. The switchgear assembly of claim 6 wherein said conductor supports further include phase-to-phase supports connected between said runbacks between said risers and said second support.

9. The switchgear assembly of claim 8 wherein said phase-to-phase supports comprise a spacer extending between adjacent of said runbacks, flanges on each end of said spacers bearing against said runbacks and fasteners securing said runbacks to said flanges.

10. The switchgear assembly of claim 9 wherein said phase-to-phase supports have opposed flanges extending laterally at each end of said spacer.

11. The switchgear assembly of claim 9 wherein said phase-to-phase supports comprise C-channel members having a web forming said spacer with said flanges extending along ends of said web.

12. The switchgear assembly of claim 6 wherein said runbacks include conductors having second ends of said elongated flat members adjacent said second support which are offset laterally by transverse sections with said pair of elongated flat members being spaced apart in said transverse section but abutting in said second ends which have aligned through apertures.

13. The switchgear assembly of claim 5 wherein said first support comprises a base member having said through openings and the rigid extensions projecting from said base member toward said quick disconnects along side said through openings and terminating in free ends, and fastener means securing said conductors to said rigid extensions adjacent said free ends.

14. The switchgear assembly of claim 13 wherein said rigid extensions have a planar surface aligned with an edge of said through opening and against which said conductor is secured by said fastener means.

* * * * *